W. WHEELER.
Curry Comb.
No. 4,470. Patented April 25, 1846.
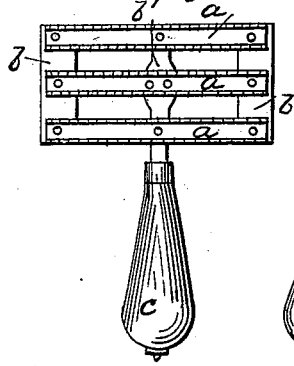
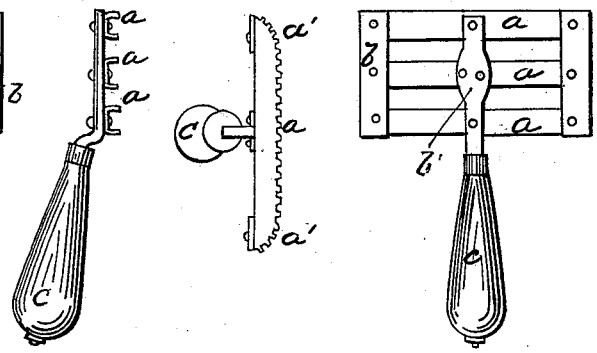
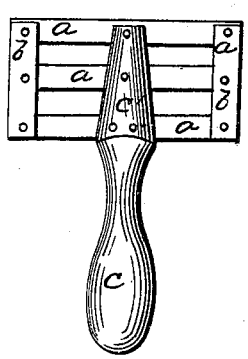
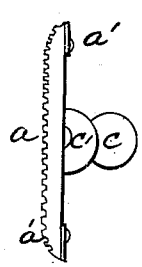

UNITED STATES PATENT OFFICE.

WM. WHEELER, OF TROY, NEW YORK.

CURRYCOMB.

Specification of Letters Patent No. 4,470, dated April 25, 1846.

*To all whom it may concern:*

Be it known that I, WILLIAM WHEELER, of Troy, in the county of Rensselaer and State of New York, have made a new and useful Improvement in the Manner of Constructing Currycombs; and I do hereby declare that the following is a full and exact description thereof.

I construct my curry combs generally, of three longitudinal bars of sheet metal, united by rivets to two transverse bars, one at each end, and one at the middle of the instrument, there being open spaces formed by the junction of these bars, or plates, through which a large portion of the dust which would otherwise lodge in the comb, escapes in the act of using it. The three longitudinal bars, are in a trough-like form, being bent twice at right angles, by which means they are rendered perfectly unyielding. The teeth are made along the edges of these trough like pieces and they are sometimes rounded off at their ends to remove their angular terminations, the bars constituting the comb, being of one uniform length.

In the accompanying drawings Figures 1, 2, 3, and 4, are different views of one of my combs in its finished state. Fig. 1, is a face view of it. Fig. 2 an end view, Fig. 3, a front view, and Fig. 4, a back view.

The teeth of this comb, are formed upon the three longitudinal bars, $a$, $a$, $a$; which are cut out of sheet-metal in such manner as to leave teeth on each edge of the piece when cut. These pieces are then bent by suitable dies, into a trough like form, as shown at $a$, $a$ Fig. 2; a side view of these trough like bars will then be such, as is seen at $a$, Fig. 3. The three longitudinal bars, are crossed by the three transverse bars $b$, $b$, $b$; the middle bar $b$, is made to extend out, so as to constitute a tine, or shank, to receive the handle $c$. The two end pieces $b$, $b$, are made sufficiently stout, to bear the blows, or rapping, necessary to the cleansing of the comb from dust, and the projecting piece which is ordinarily riveted on to curry combs, for that purpose rendered altogether unnecessary.

Figs. 5, 6, 7 and 8 are the same views of one of my combs, as those given in Figs. 1, 2, 3, and 4, but showing, a modification of it in which but two transverse bars of metal are used, namely, those marked $b$, $b$, at its ends; the use of the middle bar $b$, is, under this modification rendered unnecessary by lengthening out the wooden handle C, so as to constitute the middle transverse bar $c$, which is riveted to the longitudinal bars $a$, $a$.

In making my curry comb after this construction, it is not only rendered lighter than ordinary, but its tendency to become foul is, as above stated, much diminished, and it can be rendered at a price less than those with whole or solid backs, to which it is every way superior.

Having thus fully described the nature of my improvement in the curry comb, what I claim therein as new and desire to secure by Letters Patent, is—

The so combining of the trough-like bars which constitute the comb teeth, with the other parts, in the manner set forth, as to constitute a curry comb with an open back; I do not claim the trough-like comb, or the hollow back, individually, but only in their combination as herein fully made known.

WILLIAM WHEELER.

Witnesses:
 THOS. R. JONES,
 CHAS. G. PAGE.